US012802321B2

(12) United States Patent
Pan et al.

(10) Patent No.: US 12,802,321 B2
(45) Date of Patent: Nov. 17, 2026

(54) EFFECT PROCESSING METHOD AND DEVICE

(71) Applicant: Beijing Bytedance Network Technology Co., Ltd., Beijing (CN)

(72) Inventors: Jiali Pan, Beijing (CN); Yi Guo, Beijing (CN); Shaoyuan Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 152 days.

(21) Appl. No.: 18/567,724

(22) PCT Filed: Sep. 21, 2022

(86) PCT No.: PCT/CN2022/120347
§ 371 (c)(1),
(2) Date: Dec. 6, 2023

(87) PCT Pub. No.: WO2023/065948
PCT Pub. Date: Apr. 27, 2023

(65) Prior Publication Data
US 2024/0282030 A1 Aug. 22, 2024

(30) Foreign Application Priority Data
Oct. 18, 2021 (CN) ......................... 202111210331.4

(51) Int. Cl.
*G06T 13/20* (2011.01)
*G06T 17/00* (2006.01)

(52) U.S. Cl.
CPC .............. *G06T 13/20* (2013.01); *G06T 17/00* (2013.01); *G06T 2210/56* (2013.01)

(58) Field of Classification Search
CPC ..... G06T 13/20; G06T 17/00; G06T 2210/56; G06T 13/60; G06T 7/277; G06T 13/80
See application file for complete search history.

(56) References Cited

U.S. PATENT DOCUMENTS

2007/0159049 A1* 7/2007 Kim ........................ G06T 13/60
313/461
2008/0063236 A1 3/2008 Ikenoue et al.
2014/0125669 A1 5/2014 Kilgariff et al.

FOREIGN PATENT DOCUMENTS

CN 101071504 A 11/2007
CN 105975273 A 9/2016
(Continued)

OTHER PUBLICATIONS

Gao et al. Machine Translation of CN-112862942-A (Year: 2021).*
(Continued)

*Primary Examiner* — Kee M Tung
*Assistant Examiner* — Xiaoming Wei
(74) *Attorney, Agent, or Firm* — Alleman Hall LLP

(57) ABSTRACT

Embodiments of the present disclosure provide an effect processing method and apparatus, an electronic device, a computer readable storage medium, a computer program, and a computer program product. The method comprises: obtaining a target image, the target image comprising target motion attributes of at least two positions, target motion attributes of each position being used for forming particles into a target shape after motion; during motion of at least two particles, adjusting the motion attribute of the particles at the current position according to target motion attributes corresponding to the current position of the particles in the target image, the adjustment being used for reducing a difference between the motion attribute and the target motion attribute; and displaying the particles according to the adjusted motion attribute to obtain an effect screen, the particles being geometric display objects.

17 Claims, 4 Drawing Sheets

(56) References Cited

FOREIGN PATENT DOCUMENTS

| | | | | | |
|---|---|---|---|---|---|
| CN | 110930487 A | | 3/2020 | | |
| CN | 111292399 A | | 6/2020 | | |
| CN | 111367605 A | | 7/2020 | | |
| CN | 111563963 A | | 8/2020 | | |
| CN | 112215932 A | | 1/2021 | | |
| CN | 112446942 A | | 3/2021 | | |
| CN | 112529997 A | | 3/2021 | | |
| CN | 112700517 A | | 4/2021 | | |
| CN | 112862942 A | * | 5/2021 | ............ | G06T 17/00 |
| JP | 2011076620 A | | 4/2011 | | |

OTHER PUBLICATIONS

Ben Yang, Youquan Liu, Lihua You, Xiaogang Jin, "A unified smoke control method based on signed distance field" Computers & Graphics, vol. 37, Issue 7, 2013, pp. 775-786, ISSN 0097-8493, (Year: 2013).*

Kosmonaut's Blog, "Signed Distance Field Rendering Journey pt. 1" (Year: 2017).*

Wikipeida, "Linear Interpolation" (Year: 2020).*

Game Development Stack Exchange, mathematics—How do I linearly interpolate between two vectors? (Year: 2011).*

Kenneth I. Joy, On-Line Visualization Notes "Numerical Methods for Particle Tracing in Vector Fields", Visualization and Graphics Research Lab. UC. Davis. Feb. 20, 1999 (Year: 1999).*

Signed distance function, "Signed distance function—Wikipedia" (Year: 2020).*

Euler Method, "https://en.wikipedia.org/wiki/Euler_method" (Year: 2019).*

China National Intellectual Property Administration, International Search Report and Written Opinion Issued in Application No. PCT/CN2022/120347, Oct. 27, 2022, WIPO, 10 pages.

International Preliminary Report on Patentability for International Application No. PCT/CN2022/119408, mailed May 2, 2024, 6 pages.

International Preliminary Report on Patentability for International Application No. PCT/CN2022/120335, mailed May 2, 2024, 5 pages.

International Preliminary Report on Patentability for International Application No. PCT/CN2022/120347, mailed May 2, 2024, 6 pages.

ISA China National Intellectual Property Administration, International Search Report and Written Opinion Issued for International Application No. PCT/CN2022/119408, mailed Nov. 18, 2022, 14 Pages.

ISA China National Intellectual Property Administration, International Search Report and Written Opinion for International Application No. PCT/CN2022/120335, mailed Dec. 2, 2022, 15 Pages.

ISA Intellectual Property Office of Singapore, International Search Report and Written Opinion for International Application No. PCT/SG2022/050685, mailed May 2, 2023, 16 Pages.

* cited by examiner

EFFECT PROCESSING METHOD AND DEVICE

CROSS-REFERENCE TO RELATED APPLICATIONS

The present disclosure is a U.S. National Stage Application of PCT Application Serial No. PCT/CN2022/120347, filed on Sep. 21, 2022, which claims priority of the Chinese Patent Application No. 202111210331.4, titled "SPECIAL EFFECT PROCESSING METHOD AND DEVICE" filed on Oct. 18, 2021, the contents of the application being incorporated herein by reference.

FIELD

Embodiments of the present disclosure relates to the technical field of computer processing, and more specifically, relates to an effect processing method, apparatus, electronic device, computer readable storage medium, computer program, and a computer program product.

BACKGROUND

Effect screens may be screens with special visual effects added to images, videos, texts, and so on. A typical effect screen may be composed of a large number of particles, each of which may be a unit of arbitrarily shape. Each particle is independent and is constantly moving and changing. Wherein, motion may be regular changes, or irregular changes, and the changes may be in colors, transparency, size, and so on. For example, by simulating fireworks with a large number of particles, the upward motion of a number of particles may simulate the rise of fireworks. Once the particles rise to a certain height and disappear, more particles are displayed at the location where the particles disappear, resulting in the effect of fireworks exploding.

It can be seen that the process of generating the above effect screen is a process of generating the particles, updating the particles, and rendering the particles. The more diverse the relationship between the particle quantity, particle color, particle size, and other factors included in the effect screen, the better the richness of the effect screen. Therefore, how to improve the rich performance of the effect screen becomes an urgent problem to be solved.

SUMMARY

Embodiments of the present disclosure provide an effect processing method, apparatus, electronic device, computer readable storage medium, computer program, and computer program product, which may improve the richness of the effect screens.

In accordance with a first aspect, embodiments of the present disclosure provide an effect processing method, comprising:

Obtaining a target image, the target image comprising target motion attributes of at least two positions, the target motion attribute of each position being used for forming particles into a target shape after motion;

During motion process of at least two particles, adjusting the motion attribute of the particles at the current position according to target motion attributes corresponding to the current position of the particles in the target image, the adjustment being used for reducing a difference between the motion attribute and the target motion attribute; and Displaying the particles according to the adjusted motion attribute to obtain an effect screen, the particles being geometric display objects.

In accordance with a second aspect, embodiments of the present disclosure provide an effect processing apparatus, comprising:

A target image acquisition module, configured to obtain a target image, the target image comprising target motion attributes of at least two positions, the target motion attribute of each position being used for forming particles into a target shape after motion;

A motion attribute adjustment module, configured to, during motion process of at least two particles, adjust the motion attribute of the particles at the current position according to target motion attributes corresponding to the current position of the particles in the target image, the adjustment being used for reducing a difference between the motion attribute and the target motion attribute; and An effect screen display module, configured to display the particles according to the adjusted motion attribute to obtain an effect screen, the particles being geometric display objects.

In accordance with a third aspect, embodiments of the present disclosure provide an electronic device comprising: at least one processor and a memory, The memory stores computer executable instructions.

The at least one processor executes the computer executable instructions stored in the memory, causing the electronic device to implement the method of the first aspect.

In accordance with a fourth aspect, embodiments of the present disclosure provide a computer-readable storage medium, wherein the computer-readable storage medium stores computer executable instructions, and when a processor executes the computer executable instructions, causing a computing device to implement the method of the first aspect.

In accordance with a fifth aspect, embodiments of the present disclosure provide a computer program, wherein the computer program is configured to implement the method of the first aspect.

In accordance with a sixth aspect, embodiments of the present disclosure provide a computer program product, wherein the computer program product comprises a computer program, and the computer program, when executed by a processor, implements the method of the first aspect.

Embodiments of the present disclosure provide an effect processing method, apparatus, electronic device, computer readable storage medium, computer program, and computer program product. The method comprises: obtaining a target image, the target image comprising target motion attributes of at least two positions, the target motion attribute of each position being used for forming particles into a target shape after motion; during motion process of at least two particles, adjusting the motion attribute of the particles at the current position according to target motion attributes corresponding to the current position of the particles in the target image, the adjustment being used for reducing a difference between the motion attribute and the target motion attribute; and displaying the particles according to the adjusted motion attribute to obtain an effect screen, the particles being geometric display objects.

BRIEF DESCRIPTION OF THE DRAWINGS

In order to explain the embodiments of the present disclosure or the technical solutions in the prior art more clearly, the following will briefly introduce the drawings needed for describing the embodiments or the prior art. It will be apparent that the drawings in the following description are of some embodiments of the present disclosure. For those skilled in the art, other drawings can be derived from these drawings without exerting creative efforts.

DETAILED DESCRIPTION OF EMBODIMENTS

In order to make the purposes, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are some, but not all, of the embodiments of the present disclosure. Based on the embodiments in this disclosure, all other embodiments obtained by those skilled in the art without making creative efforts fall within the scope of protection of this disclosure.

Figure 1:
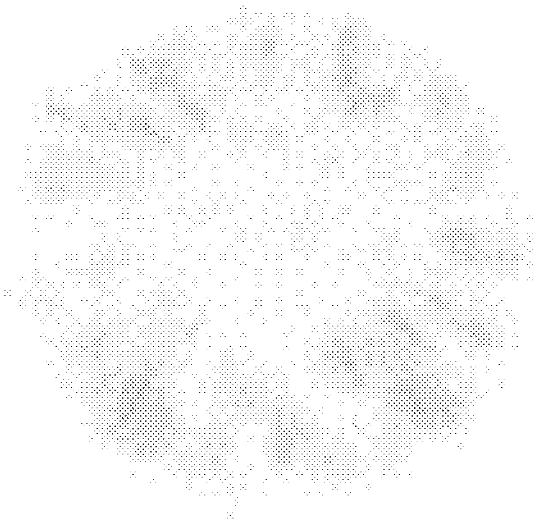
FIG. 1 is a schematic diagram of an effect screen that simulates an explosion effect of fireworks through particles.

The embodiments of the present disclosure may be applied to the process of simulating effect screens through particles. FIG. 1 is a schematic diagram of an effect screen that simulates an explosion effect of fireworks through particles, wherein a particle may be constituted of one or more adjacent pixels. Of course, the effect screen that may be simulated through particles may include but are not limited to: cloud effect, volcanic eruption effect, and flame effect.

In order to realize the effect screen, it may be carried out through an electronic device, which is equipped with a processor that may perform a large number of computation and a screen that may display particles. The processor may be a central processing unit (CPU) or a graphic processing unit (GPU).

Since effect screens are formed by the motion of a large number of particles, the processor requires powerful computing capabilities. And because the GPU has better parallel computing capabilities than the CPU, using the GPU to simulate effect screens may effectively improve the computing performance of particles.

In the prior art, when simulating effect screens through the GPU, a fixed method is used to update the attributes of particles, resulting in poor diversity of effect screens.

In order to solve the above problem, the embodiment of the present disclosure may adjust the motion attribute of particles through the target motion attributes of at least two positions in the target image, so that the particles move according to the adjusted motion attributes to form an effect screen with a target shape. That is, the shape of an effect screen finally displayed can be specified by means of a target image, and different shapes of effect screens can be achieved by means of different target images, such that the richness of the effect screens is improved.

The technical solutions of the embodiment of the present disclosure and how the technical solutions of the present disclosure solve the above technical problems will be described in detail below with specific embodiments. The following specific embodiments can be combined with each other, and the same or similar concepts or processes may not be described again in some embodiments. The embodiment of the present disclosure will be described below with reference to the drawings.

Figure 2:
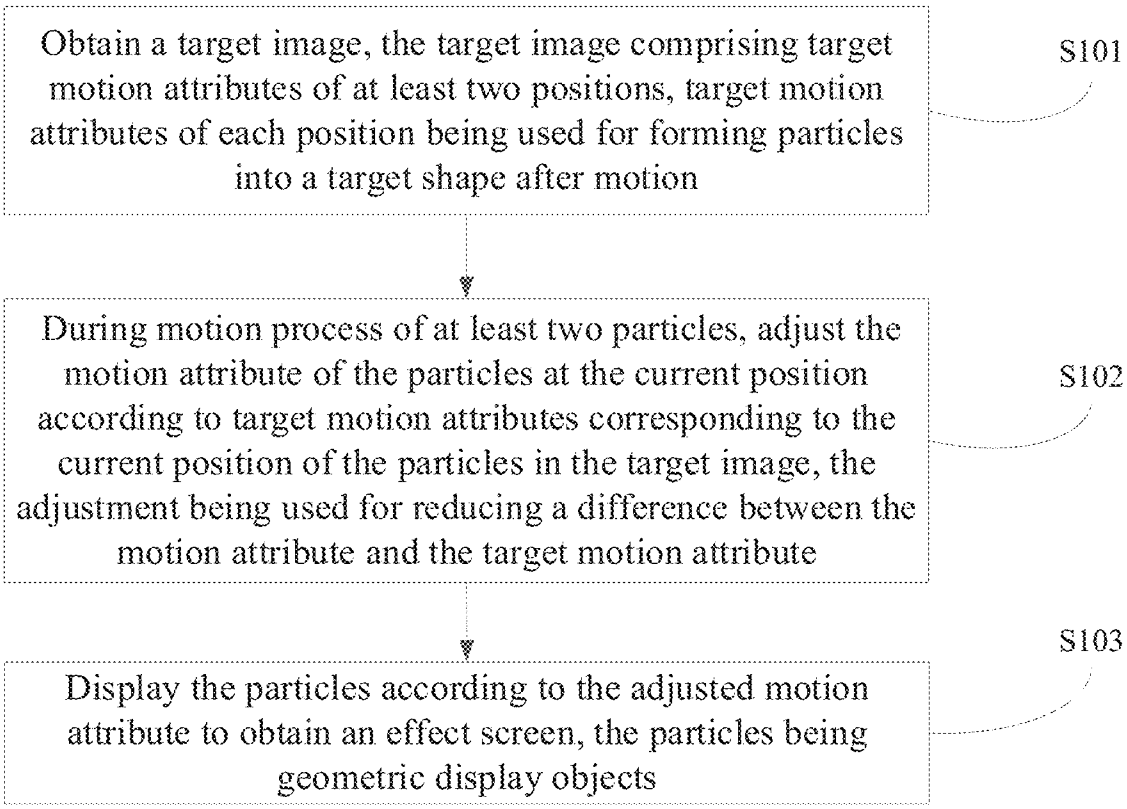
FIG. 2 is a step flowchart of an effect processing method provided by embodiments of the present disclosure.

FIG. 2 is a step flowchart of an effect processing method provided by embodiments of the present disclosure. The method shown in FIG. 2 may be applied in an electronic device. Referring to FIG. 2, the effect processing method comprises:

S101: obtain a target image, the target image comprising target motion attributes of at least two positions, target motion attributes of each position being used for forming particles into a target shape after motion.

Wherein the target image is any image including target motion attributes. A commonly used target image may be a signed distance function (SDF) graph, also known as a texture graph. The SDF is a function between two vectors, which means that the input is a vector and the output is also a vector. The SDF graph may be three-dimensional or two-dimensional. The three-dimensional SDF graph may be represented by a vector field. All points in the three-dimensional SDF graph tend to another three-dimensional vector. The embodiment of the present disclosure may drive particles to move toward a target area through the three-dimensional vector, and finally form a target shape in the target area.

Based on the above description, it can be understood that the above target motion attribute may be represented by a vector. For example, the target motion attribute may be a three-dimensional vector, causing the particles move in a three-dimensional space, and the final formed target shape is also a shape in a three-dimensional space.

The target motion attribute may be speed, acceleration, position, etc., which are not limited in the embodiment of the present disclosure.

The target image may be obtained by converting the target model. Specifically, first, obtain a target model corresponding to the target shape, the target model comprising at least two points; then, converting the position of each point in the target model to the target motion attribute of the position in the target image.

Wherein the target model is a model composed of at least two points, and these points constitute the target shape. It can be understood that the position of each point in the target model is a vector, which may be called a position vector. Performing linear or nonlinear transformation to the position vector may obtain the target motion attributes of that position.

In the prior art, there are tools such as blender, houdini, unity, etc. that can convert target models to SDF graphs, so these tools may be used directly to obtain SDF graphs.

S102: during motion process of at least two particles, adjust the motion attribute of the particles at the current position according to target motion attributes corresponding to the current position of the particles in the target image, the adjustment being used for reducing a difference between the motion attribute and the target motion attribute.

Wherein particles are randomly generated, that is, when generating particles, position, color, size, maximum display duration and other attributes of the particles are set randomly. After the particles are generated, the effect screen of the particles in their initial state may be displayed.

After the particles are generated, motion attributes of the particles at the current position may be updated to make the particles move. Therefore, the motion attributes of particles are different at different positions.

The target motion attribute relied upon by the adjustments is determined based on the current position. The target motion attribute corresponding to the current position in the target image is the target motion attribute of the position closest to the current position in the target image. In an ideal state, the position closest to the current position is the current position.

In the embodiment of the present disclosure, the adjusted motion attribute may be obtained in two ways.

In a first way, the target motion attribute and the motion attribute to be adjusted are weighted to obtain the adjusted motion attribute. Assuming the motion attribute is an I-dimensional vector, the adjusted motion attribute may be calculated through the following formula:

$$AV_i = p1 \cdot V1_i + p2 \cdot V2_i$$

Wherein $AV_i$ is the value of the i-th dimension of the adjusted motion attribute, $V1_i$ is the value of the i-th dimension of the motion attribute before adjustment, $V2_i$ is the value of the i-th dimension of the target motion attribute, p1 is the weighting coefficient of $V1_i$, and p2 is the weighting coefficient of $V2_i$.

Of course, the weighting coefficients need to meet the preset conditions so that the adjusted motion attribute is closer to the target motion attribute than the motion attribute before adjustment. Both the p1 and p2 are larger than 0, and p1+p2=1.

In a second way, first, the vector difference between the target motion attribute and the motion attribute before adjustment is determined; then, the adjustment amount is determined based on the vector difference and the preset coefficient; finally, the adjusted motion attribute is determined based on the sum of the adjustment amount and the motion attribute before adjustment.

Wherein, the adjustment amount may be the product of the vector difference and a preset coefficient, and the preset coefficient is a value greater than 0 and less than 1. For example, the preset coefficient may be 0.2, so that each adjustment may reduce the difference between the motion attribute and the target motion attribute by 20%.

It should be noted that when the preset coefficient is set to a larger value, fewer adjustments are required to form the target shape. That is, the target shape is formed in a shorter time, but the continuity between different positions is poor, and the process of forming the target shape would not be clear enough. When the preset coefficient is set to a smaller value, more adjustments are required to form the target shape. That is, the target shape is formed in a longer time, but the continuity between different positions is better, and the process of forming the target shape is clearer.

In order to accurately control the target shape finally formed by the particles, the embodiments of the present disclosure control the target shape through a geometry, including the position and size of the target shape, that is, the target shape is located in the geometry.

In addition, it can be seen from the above description that the at least two particles are randomly generated, and their positions are represented by coordinates in the world coordinate system. That is, the afore-mentioned current position is the position in the world coordinate system. Therefore, in order to achieve the above-mentioned control of the target shape, when adjusting the motion attribute of the particles at the current position according to the target motion attribute corresponding to the current position of the particles in the target image, it needs to be adjusted according to the following process: first, converting the current position of the particle in the world coordinate system to the second position of the particle in the geometry; then, according to the target motion attribute corresponding to the second position of the particles in the target image, adjusting the motion attribute of the particles at the current position.

Wherein the target motion attribute corresponding to the second position of the particle in the target image is the target motion attribute of the position closest to the second position in the target image. In an ideal state, the position closest to the second position is the second position.

The target shape may be any shape located in the geometry, and the size of the target shape can be less than or equal to the size of the geometry.

Alternatively, the target shape may be an inscribed shape of the geometry, so that the size of the target shape is as close as possible to the size of the geometry, which also ensures that the size of the final formed target shape is consistent with the size of the preset geometry, achieving accurate control of the size of the effect screen.

The geometry may be any geometry, for example, a cuboid, a cube, a cylinder, a cone, a sphere, etc. The embodiments of the present disclosure do not limit the shape of the geometry.

In order to achieve a more flexible effect screen, in the embodiments of the present disclosure, the size of the geometry, position of the geometry, and rotation angle of the geometry relative to the world coordinate system are not limited. That is, the geometry may not be located at the origin of the world coordinate system, and the geometry may have an angle with the world coordinate system.

Figure 3:
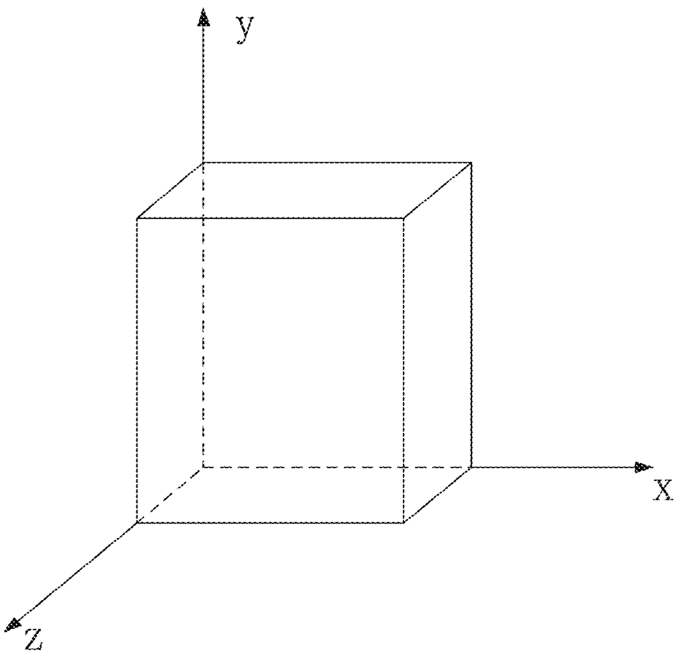
FIG. 3 is a schematic diagram of the relationship between a cuboid and a world coordinate system provided by embodiments of the disclosure.

FIG. 3 is a schematic diagram of the relationship between a cuboid and a world coordinate system provided by embodiments of the disclosure. Referring to FIG. 3, there is no rotation angle between the cuboid and the world coordinate system. One vertex of the cuboid is the origin of the world coordinate system, and the three sides of the cuboid coincide with the coordinate axes of the world coordinate system, respectively. At this time, the position in the cuboid is the position in the world coordinate system, and there is no need to convert the position in the world coordinate system.

On the contrary, when there is a rotation angle between the cuboid and the world coordinate system, and/or the vertex of the cuboid is not the origin of the world coordinate system, and/or, when at least one of the three sides of a vertex of the cuboid does not coincide with the coordinate axis of the world coordinate system, the position in the cuboid is not the position in the world coordinate system, and the position in the world coordinate system needs to be converted to the position in the cuboid.

Figure 4:
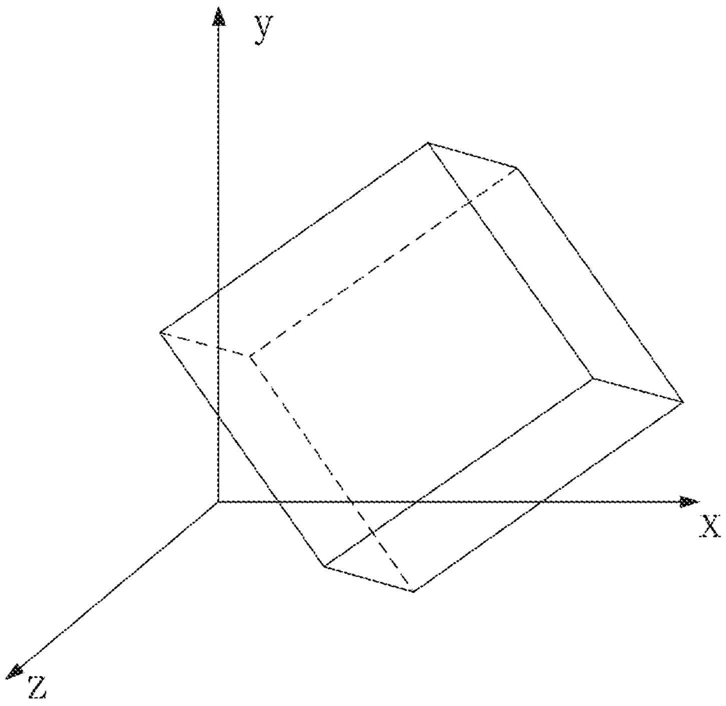
FIG. 4 is a schematic diagram of another relationship between a cuboid and a world coordinate system provided by embodiments of the disclosure.

FIG. 4 is a schematic diagram of another relationship between a cuboid and a world coordinate system provided by embodiments of the disclosure. Referring to FIG. 4, there is an angle between the cuboid and the world coordinate system. The vertex of the cuboid is not the origin of the world coordinate system, and the three sides of any vertex of the cuboid do not coincide with the coordinate axis of the world coordinate system. At this time, the position in the world coordinate system needs to be converted to a position in the cuboid.

Optionally, converting the current position of the particle in the world coordinate system to the second position of the particle in the geometry, may comprise: converting the current position of the particles in the world coordinate system to the second position of the particles in the geometry according to attributes of the geometry, wherein the attributes of the geometry comprise at least one of the following: size of the geometry, center position of the geometry, and the angle of the geometry relative to the world coordinate system.

The process of determining the second location based on the attributes may include the following processes:

First, construct four matrices S, T, R and L.

When the geometry is a cuboid, the dimensions of the geometry include the length, width, and height of the cuboid, so the following matrix S can be constructed from the length, width, and height:

$$S = \begin{bmatrix} S_1 & 0 & 0 & 0 \\ 0 & S_2 & 0 & 0 \\ 0 & 0 & S_3 & 0 \\ 0 & 0 & 0 & 1 \end{bmatrix}$$

Wherein, $S_1$ is the reciprocal of length, $S_2$ is the reciprocal of width, and $S_3$ is the reciprocal of height.

Construct the following matrix T based on the center position of the geometry:

$$T = \begin{bmatrix} 1 & 0 & 0 & T_x \\ 0 & 1 & 0 & T_z \\ 0 & 0 & 1 & T_y \\ 0 & 0 & 0 & 1 \end{bmatrix}$$

Wherein $T_x$, $T_y$, and $T_z$ are respectively the x coordinate, y coordinate, and z coordinate of the center position of the geometry.

According to the angles α, β and γ between the geometry and the three planes YOZ, XOZ and XOY respectively, the following matrix R is constructed:

$$T = \begin{bmatrix} \cos\gamma\cos\beta & -\sin\gamma\cos\alpha + \cos\gamma\sin\beta\sin\alpha & \sin\gamma\sin\alpha + \cos\gamma\sin\beta\cos\alpha & 0 \\ \sin\gamma\cos\beta & \cos\gamma\cos\alpha + \sin\gamma\sin\beta\sin\alpha & -\cos\gamma\sin\alpha + \sin\gamma\sin\beta\cos\alpha & 0 \\ -\sin\beta & \cos\beta\sin\alpha & \cos\beta\cos\alpha & 0 \\ 0 & 0 & 0 & 1 \end{bmatrix}$$

Construct the following matrix L based on the current position of the particles in the world coordinate system:

$$L = [L_x \;\; L_y \;\; L_z \;\; 1]$$

Wherein $L_x$, $L_y$, and $L_z$ are the x coordinate, y coordinate, and z coordinate of the current position, respectively.

Then, calculate the product of the above four matrices to obtain the target matrix L2=S·R·T·L. It can be seen that L2 is a 1*4 matrix.

Finally, use the first three columns in L2 as the x coordinate, y coordinate, and z coordinate of the second position in the geometry.

After the second position is obtained, the motion attribute may be adjusted, and the adjustment may include two ways:

In a first way, according to the target motion attribute corresponding to the second position in the target image, the motion attribute of the particles at the current position may be adjusted. Same as the process of adjusting the motion attribute of particles at the current position based on the target motion attribute corresponding to the current position in the target image, the adjusted motion attribute is also determined based on the target motion attribute and the motion attributes before adjustment. The process of determining the adjusted motion attribute may refer to the foregoing detailed description, and will not be described again here.

In a second way, first, the second position is normalized to obtain a third position, each coordinate of the third position being greater than or equal to 0 and less than or equal to 1; then, according to the target motion attribute corresponding to the third position of each particles in the target image, performing the above adjustment to the motion attribute of the particles at the current position.

Wherein the target motion attribute corresponding to the third position in the target image is the target motion attribute of the position closest to the third position in the target image. In an ideal state, the position closest to the third position is the third position.

Same as the process of adjusting the motion attribute of particles at the current position based on the target motion attribute corresponding to the current position in the target image, according to the target motion attribute corresponding to the third position in the target image, the above adjustment is made to the motion attribute of the particles at the current position, that is, the adjusted motion attribute is also determined based on the target motion attribute and the motion attribute before adjustment. The process of determining the adjusted motion attribute may refer to the foregoing detailed description, and will not be described again here.

Figure 5:
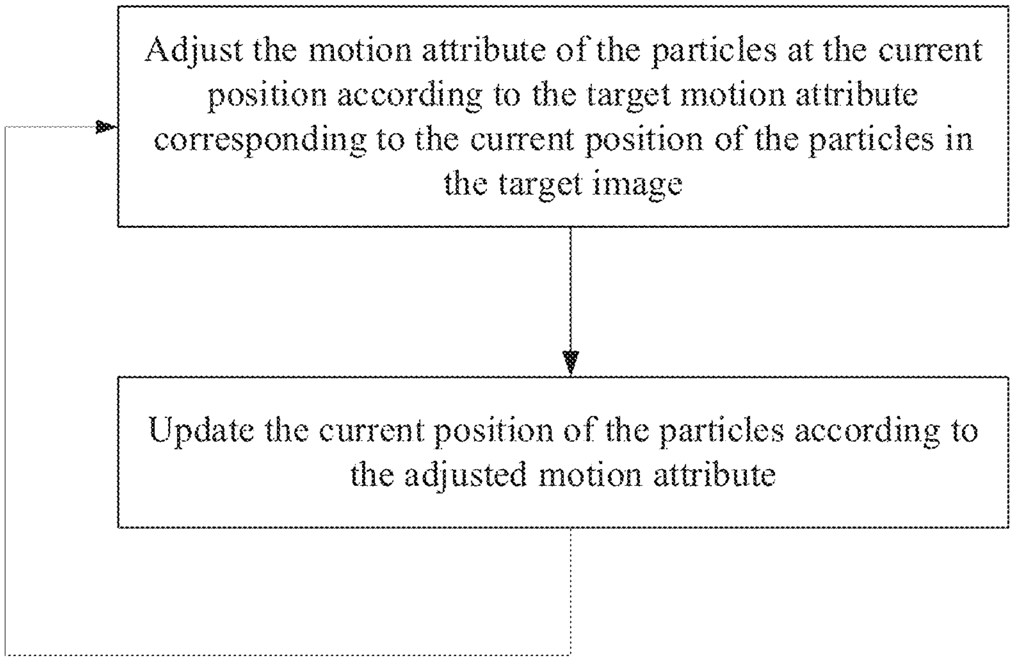
FIG. 5 is a schematic diagram of a cyclic adjustment process of motion attributes provided by embodiments of the present disclosure.

The embodiments of the present disclosure can implement a cyclic adjustment process of motion attributes, so that every time a particle reaches a position, the motion attributes of the particles at that position are updated until the at least two particles form a target shape. In this way, different positions can have different motion attributes. FIG. 5 is a schematic diagram of a cyclic adjustment process of motion attributes provided by embodiments of the present disclosure. Referring to FIG. 5, after each execution of S102, the current position of the particles is updated according to the adjusted motion attribute, and S102 is executed again.

Wherein the algorithm for updating the current position is related to motion attributes. For example, when the motion attribute is the motion speed of particles, first, determine the motion distance based on the motion speed and update duration; then, the updated current position is determined based on the motion distance and the current position before the update.

S103: display the particles according to the adjusted motion attribute to obtain an effect screen, the particles being geometric display objects.

Wherein the display object is displayed on one or more pixels, and these pixels constitute the geometric shape. The position, color, brightness, etc. of these pixels may change over time.

Specifically, the particles are displayed after each motion attribute is adjusted, that is, the vertex/pixel shader is called to render the particles to obtain an effect screen. In this way, effect screens are formed by the continuous motion of particles.

Wherein when rendering particles, the vertex/pixel shader may call geometric shapes to render particles, so as to render particles of different geometric shapes. The geometric shape may include, but is not limited to: a point, a line, a face, and a cube. Wherein the face may be a square, a triangle, a strip, a grid, etc. The embodiments of the present disclosure do not limit the geometric shape of the particles.

It should be noted that the pixels constituting the particles may be adjacent or non-adjacent.

It can be seen from the foregoing description of the embodiments of the present disclosure that, the motion attributes of particles, the position in the target image, the target motion attributes, and the current position of the particles used in the embodiments of the present disclosure are all three-dimensional, and the target model is a three-dimensional model, so the generated effect screen is also three-dimensional. In this way, the embodiments of the present disclosure can further improve the richness of effect screens.

Of course, in practical applications, the target model may also be a two-dimensional model, and the target motion attributes, positions, and motion attributes of the particles are all two-dimensional vectors, so that the effect screen generated in this way is two-dimensional. The embodiments of the present disclosure do not make limitations on this.

Figure 6:
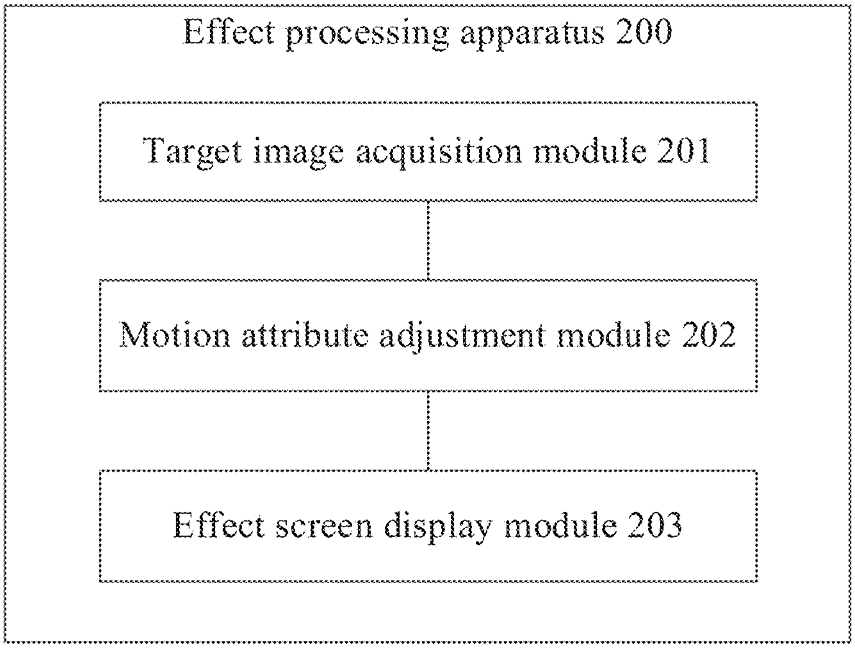
FIG. 6 is a structural block diagram of an effect processing apparatus provided by embodiments of the present disclosure.

Corresponding to the effect processing method in the above embodiments, FIG. 6 is a structural block diagram of an effect processing apparatus provided by embodiments of the present disclosure. For convenience of illustration, only parts related to the embodiments of the present disclosure are shown. Referring to FIG. 6, the effect processing apparatus 200 comprises: a target image acquisition module 201, a motion attribute adjustment module 202, and an effect screen display module 203.

Wherein a target image acquisition module 201, configured to obtain a target image, the target image comprising target motion attributes of at least two positions, target motion attributes of each position being used for forming particles into a target shape after motion.

A motion attribute adjustment module 202, configured to, during motion process of the at least two particles, adjust motion attributes of the particles at the current position according to target motion attributes corresponding to the current position of the particles in the target image, the adjustment being used for reducing a difference between the motion attribute and the target motion attribute.

An effect screen display module 203, configured to display the particles according to the adjusted motion attribute to obtain an effect screen, the particles being geometric display objects.

Optionally, the motion attribute adjustment module 202 is further configured to:

Convert the current position of the particles in a world coordinate system to a second position of the particles in a geometry, wherein the target shape is located in the geometry; and according to the target motion attribute corresponding to the second position of the particles in the target image, adjust the motion attribute of the particles at the current position.

Optionally, the motion attribute adjustment module 202 is further configured to:

When converting the current position of the particles in the world coordinate system to the second position of the particles in the geometry, convert the current position of the particles in the world coordinate system to the second position of the particles in the geometry according to attributes of the geometry, wherein the attributes of the geometry comprise at least one of the following: size of the geometry, center position of the geometry, and angle of the geometry relative to the world coordinate system.

Optionally, each position in the target image is a normalized position, and the motion attribute adjustment module 202 is further configured to:

When adjusting the motion attribute of the particles at the current position according to the target motion attribute corresponding to the second position of the particles in the target image, normalize the second position to obtain a third position, each coordinate of the third position being greater than or equal to 0 and less than or equal to 1; according to the target motion attribute corresponding to the third position of each particles in the target image, adjust the motion attribute of the particles at the current position.

Optionally, the motion attribute adjustment module 202 is further configured to:

perform a weighted summation to the target motion attribute corresponding to the current position of the particles in the target image and the motion attribute of the particles at the current position, to obtain the adjusted motion attribute, a weighting coefficient of the target motion attribute and a weighting coefficient of the motion attribute both being greater than 0, and a sum of the weighting coefficient of the target motion attribute and the weighting coefficient of the motion attribute being 1.

Optionally, the apparatus further comprises:

A next-time adjustment module, configured to, after adjusting the motion attribute of the particles at the current position according to the target motion attribute corresponding to the current position of the particles in the target image, update the current position of the particles according to the adjusted motion attribute, and enter the motion attribute adjustment module 202.

Optionally, the target image acquisition module 201 is further configured to:

obtain a target model corresponding to the target shape, the target model comprising at least two points; and convert the position of each point in the target model to the target motion attribute of the position in the target image.

Optionally, the target motion attributes, the position, and the motion attributes of the particles are all three-dimensional vectors, and the target model is a three-dimensional model.

Optionally, the target shape is an inscribed shape of the geometry.

The effect processing apparatus provided by the present embodiment may be used to execute the technical solution of the above method embodiment shown in FIG. 2. The implementation principles and technical effects are similar, and will not be described again in the present embodiment.

Figure 7:
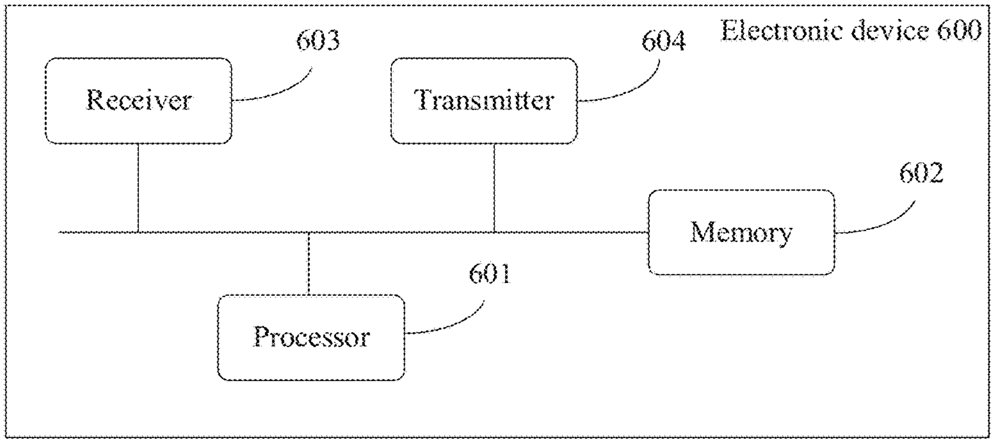
FIG. 7 is a structural block diagram of an electronic device provided by embodiments of the present disclosure.

FIG. 7 is a structural block diagram of an electronic device 600 provided by embodiments of the present disclosure. The electronic device 600 comprises a memory 602 and at least one processor 601;

Wherein the memory 602 stores computer executable instructions; and

The at least one processor 601 executes computer executable instructions stored in the memory 602, causing the electronic device 600 to implement the aforementioned effect processing method in FIG. 2.

In addition, the electronic device may also include a receiver 603 and a transmitter 604. The receiver 603 is used for receiving information from other apparatuses or devices and forwarding it to the processor 601. The transmitter 604 is used for sending information to other apparatuses or devices.

Figure 8:
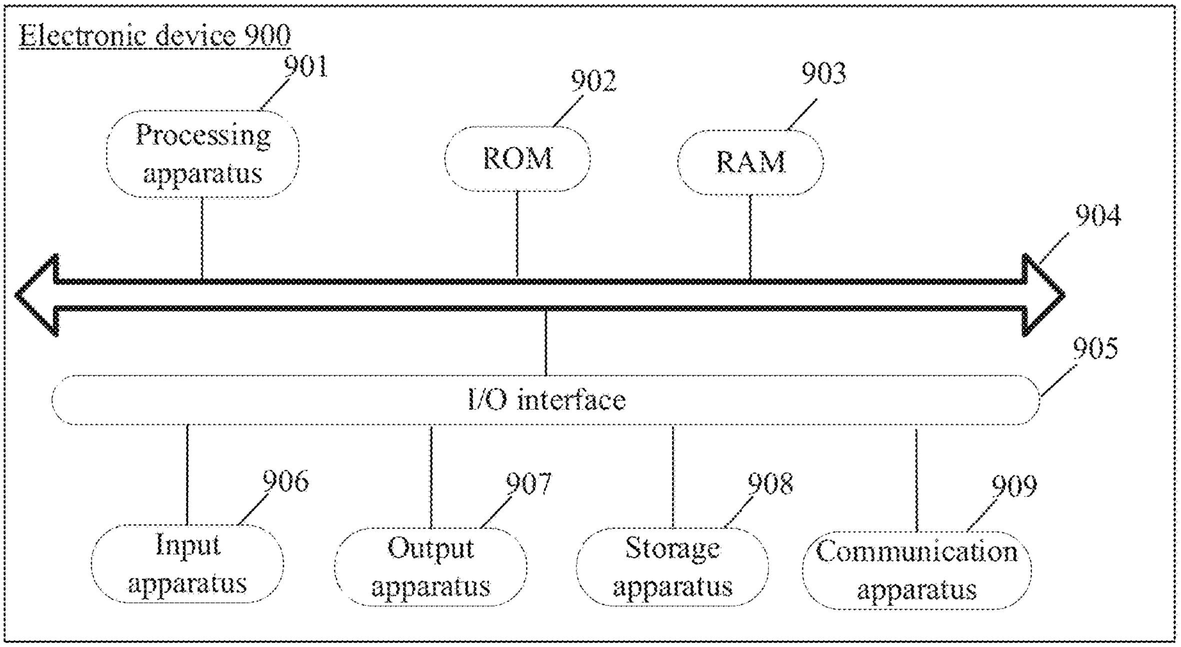
FIG. 8 is a structural block diagram of another electronic device provided by embodiments of the present disclosure.

Further, referring to FIG. 8, it shows a structural schematic diagram of an electronic device 900 suitable for implementing the embodiments of the present disclosure. The electronic device 900 may be a terminal device. Wherein the terminal device may include but is not limited to mobile terminals such as mobile phones, laptops, digital broadcast receivers, personal digital assistants (PDA for short), portable Android devices (PAD for short), portable media players (PMP for short), vehicle-mounted terminals (such as vehicle-mounted navigation terminals), etc., and fixed terminals such as digital televisions (TV for short), desktop computers, etc. The electronic device shown in FIG. 8 is only an example and should not impose any limitations on the functions and scope of use of the embodiments of the present disclosure.

As shown in FIG. 8, the electronic device 900 may include a processing apparatus (such as a central processing unit, a graphic processing unit, etc.) 901, which may perform various appropriate actions and processes according to programs stored in a read-only memory (ROM) 902 or programs loaded from a storage apparatus 908 into a random access memory (RAM) 903. In the RAM 903, various programs and data required for the operation of the electronic device 900 may also be stored. The processing apparatus 901, the ROM 902, and the RAM 903 are connected to each other through a bus 904. An input/output (I/O) interface 905 is also connected to the bus 904.

Typically, the following apparatuses may be connected to the I/O interface 905: input apparatus 906 including, for example, a touch screen, a touch pad, a keyboard, a mouse, a camera, a microphone, an accelerometer, a gyroscope, etc.; output apparatus 907 including, for example, a liquid crystal display (LCD for short), a speaker, a vibrator, etc.; storage apparatus 908 including, for example, a magnetic tape, a hard disk, etc.; and communication apparatus 909. The communication apparatus 909 may allow the electronic device 900 to communicate wirelessly or wiredly with other devices to exchange data. Although FIG. 8 illustrates an electronic device 900 having various apparatus, it should be understood that implementation or availability of all illustrated apparatus is not required. More or fewer apparatuses may alternatively be implemented or provided.

In particular, according to the embodiments of the present disclosure, the processes described above with reference to the flowchart may be implemented as a computer software program. For example, the embodiments of the present disclosure comprise a computer program product including a computer program carried on the non-transitory computer-readable medium, the computer program including program code for performing the method illustrated in the flowchart. In such embodiment, the computer program may be downloaded from the network and installed via communication apparatus 909, or installed from storage apparatus 908, or installed from the ROM 902. When the computer program is executed by the processing apparatus 901, the above functions defined in the method of the embodiments of the present disclosure are performed.

It should be noted that the above computer-readable medium in the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, apparatus or device, or any combination thereof. More specific examples of computer-readable storage media may include, but not limited to: electrical connections having one or more wires, portable computer disks, hard drives, random access memory (RAM), read-only memory (ROM), Erasable Programmable Read-Only Memory (EPROM or flash memory), optical fibers, portable Compact Disc Read-Only Memory (CD-ROM), optical storage devices, magnetic storage devices, or any suitable combination of the above. In the present disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the above. A computer-readable signal medium may further be any computer-readable medium other than a computer-readable storage medium, and the computer-readable signal medium can send, propagate, or transmit a program for use by or in connection with an instruction execution system, apparatus, or device. Program code contained on a computer-readable medium may be transmitted using any appropriate medium, including but not limited to: wires, optical cables, Radio Frequency (RF), etc., or any suitable combination of the above.

The above computer-readable medium may be included in the electronic device; it may also exist independently without being assembled into the electronic device.

The computer-readable medium carries one or more programs. When the above one or more programs are executed by the electronic device, the electronic device is caused to execute the method of the embodiments.

Computer program code for performing the operations of the present disclosure may be written in one or more programming languages, or a combination thereof. The above programming languages include, but not limited to, object-oriented programming languages such as Java, Smalltalk, and C++, and also include conventional procedural programming languages such as "C" language or similar programming languages. The program code may execute entirely on the user's computer, partly on the user's computer, as a stand-alone software package, partly on the user's computer and partly on a remote computer, or entirely on the remote computer or server. In situations involving remote computers, the remote computer may be connected to the user's computer through any kind of network, including Local Area Network (LAN) or Wide Area Network (WAN), or may be connected to an external computer (such as through the Internet using an Internet service provider).

The flowcharts and block diagrams in the drawings illustrate the architecture, functionality, and operations of possible implementations of systems, methods, and computer program products according to various embodiments of the present disclosure. In this regard, each block in the flowchart or block diagram may represent a module, segment, or portion of code, containing one or more executable instructions for implementing the specified logical function. It should also be noted that, in some alternative implementations, the functions noted in the block may occur out of the order noted in the drawings. For example, two blocks shown one after another may actually execute substantially in parallel, or they may sometimes execute in the reverse order, depending on the functionality involved. It should also be noted that each block of the block diagram and/or flowchart illustration, and combinations of blocks in the block diagram and/or flowchart illustration, may be implemented by special purpose hardware-based systems that perform the specified functions or operations, or may be implemented using a combination of specialized hardware and computer instructions.

The units involved in the embodiments of the present disclosure may be implemented in software or hardware. Wherein, the name of a unit in a case does not constitute a qualification of the unit itself.

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), and Complex Programmable Logic Device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but not limited to, electronic, magnetic, optical, electromagnetic, infrared, or semiconductor systems, apparatuses or devices, or any suitable combination of the above. More specific examples of the machine-readable storage medium may include an electrical connection based on one or more wires, a portable computer disk, a hard disk, a random access memory (RAM), a read-only memory (ROM), Erasable Programmable Read-Only Memory (EPROM or flash memory), an optical fiber, a portable Compact Disc Read-Only Memory (CD-ROM), an optical storage device, a magnetic storage device, or any suitable combination of the above.

In a first example of the first aspect, embodiments of the present disclosure provide an effect processing method, comprising:

Obtaining a target image, the target image comprising target motion attributes of at least two positions, the target motion attribute of each position being used for forming particles into a target shape after motion;

During motion process of at least two particles, adjusting the motion attribute of the particles at the current position according to target motion attributes corresponding to the current position of the particles in the target image, the adjustment being used for reducing a difference between the motion attribute and the target motion attribute; and Displaying the particles according to the adjusted motion attribute to obtain an effect screen, the particles being geometric display objects.

Based on the first example of the first aspect, in a second example of the first aspect, adjusting the motion attribute of the particles at the current position according to target motion attributes corresponding to the current position of the particles in the target image comprises:

Converting the current position of the particles in a world coordinate system to a second position of the particles in a geometry, wherein the target shape is located in the geometry; and According to the target motion attribute corresponding to the second position of the particles in the target image, adjusting the motion attribute of the particles at the current position.

Based on the second example of the first aspect, in a third example of the first aspect, converting the current position of the particles in the world coordinate system to the second position of the particles in the geometry comprises:

Converting the current position of the particles in the world coordinate system to the second position of the particles in the geometry according to attributes of the geometry, wherein the attributes of the geometry comprises at least one of the following: a size of the geometry, a center position of the geometry, and an angle of the geometry relative to the world coordinate system.

Based on the second example of the first aspect, in a fourth example of the first aspect, each position in the target image is a normalized position, and wherein according to the target motion attribute corresponding to the second position of the particles in the target image, adjusting the motion attribute of the particles at the current position comprises:

Normalizing the second position to obtain a third position, wherein each coordinate of the third position is greater than or equal to 0 and less than or equal to 1; and According to target motion attribute corresponding to the third position of each particle in the target image, adjusting the motion attribute of the particles at the current position.

Based on the first example of the first aspect, in a fifth example of the first aspect, adjusting the motion attribute of the particles at the current position according to target motion attributes corresponding to the current position of the particles in the target image comprises:

Performing a weighted summation to the target motion attributes corresponding to the current position of the particles in the target image and the motion attributes of the particles at the current position, to obtain adjusted motion attributes, wherein a weighting coefficient of the target motion attributes and a weighting coefficient of the motion attributes are both greater than 0, and a sum of the weighting coefficient of the target motion attributes and the weighting coefficient of the motion attributes is 1.

Based on the fifth example of the first aspect, in a sixth example of the first aspect, after adjusting the motion attribute of the particles at the current position according to target motion attributes corresponding to the current position of the particles in the target image, the method further comprises:

Updating the current position of the particles according to the adjusted motion speed, and entering a step of adjusting the motion attribute of the particles at the current position according to the target motion attribute corresponding to the current position of the particles in the target image.

Based on the second example of the first aspect, in a seventh example of the first aspect, obtaining the target image comprises:

Obtaining a target model corresponding to the target shape, the target model comprising at least two points; and Converting a position of each point in the target model to the target motion attribute of the position in the target image.

Based on the seventh example of the first aspect, in an eighth example of the first aspect, the target motion attributes, the position, and the motion attribute of the particles are all three-dimensional vectors, and the target model is a three-dimensional model.

Based on the seventh example of the first aspect, in a ninth example of the first aspect, the target shape is an inscribed shape of the geometry.

In a first example of the second aspect, provided is an effect processing apparatus, comprising:

A target image acquisition module, configured to obtain a target image, the target image comprising target motion attributes of at least two positions, the target motion attribute of each position being used for forming particles into a target shape after motion;

A motion attribute adjustment module, configured to, during motion process of at least two particles, adjust the motion attribute of the particles at the current position according to target motion attributes corresponding to the current position of the particles in the target image, the adjustment being used for reducing a difference between the motion attribute and the target motion attribute; and An effect screen display module, configured to display the particles according to the adjusted motion attribute to obtain an effect screen, the particles being geometric display objects.

Based on the first example of the second aspect, in a second example of the second aspect, the motion attribute adjustment module is further configured to:

Convert the current position of the particles in a world coordinate system to a second position of the particles in a geometry, wherein the target shape is located in the geometry; and according to the target motion attribute corresponding to the second position of the particles in the target image, adjust the motion attribute of the particles at the current position.

Based on the second example of the second aspect, in a third example of the second aspect, the motion attribute adjustment module is further configured to:

When converting the current position of the particles in the world coordinate system to the second position of the particles in the geometry, convert the current position of the particles in the world coordinate system to the second position of the particles in the geometry according to attributes of the geometry, wherein the attributes of the geometry comprises at least one of the following: a size of the geometry, a center position of the geometry, and an angle of the geometry relative to the world coordinate system.

Based on the second example of the second aspect, in a fourth example of the second aspect, each position in the target image is a normalized position, and the motion attribute adjustment module is further configured to:

When adjusting the motion attribute of the particles at the current position according to the target motion attribute corresponding to the second position of the particles in the target image, normalize the second position to obtain a third position, each coordinate of the third position being greater than or equal to 0 and less than or equal to 1; and according to the target motion attribute corresponding to the third position of each particle in the target image, adjust the motion attribute of the particles at the current position.

Based on the first example of the second aspect, in a fifth example of the second aspect, the motion attribute adjustment module is further configured to:

Preform a weighted summation to the target motion attributes corresponding to the current position of the particles in the target image and the motion attributes of the particles at the current position, to obtain adjusted motion attributes, wherein a weighting coefficient of the target motion attributes and a weighting coefficient of the motion attributes are both greater than 0, and a sum of the weighting coefficient of the target motion attributes and the weighting coefficient of the motion attributes is 1.

Based on the fifth example of the second aspect, in a sixth example of the second aspect, the apparatus further comprises:

A next-time adjustment module, configured to, after adjusting the motion attribute of the particles at the current position according to the target motion attribute corresponding to the current position of the particles in the target image, update the current position of the particles according to the adjusted motion speed, and enter the motion attribute adjustment module.

Based on the second example of the second aspect, in a seventh example of the second aspect, the target image acquisition module is further configured to:

Obtain a target model corresponding to the target shape, the target model comprising at least two points; and convert a position of each point in the target model to the target motion attribute of the position in the target image.

Based on the seventh example of the second aspect, in an eighth example of the second aspect, the target motion attributes, the position, and the motion attribute of the particles are all three-dimensional vectors, and the target model is a three-dimensional model.

Based on the seventh example of the second aspect, in a ninth example of the second aspect, the target shape is an inscribed shape of the geometry.

In accordance with a third aspect, according to one or more embodiments of the present disclosure, an electronic device is provided, comprising: at least one processor and a memory;

The memory stores computer executable instructions.

The at least one processor executes the computer executable instructions stored in the memory, causing the electronic device to implement the method of any one of the first aspect.

In accordance with a fourth aspect, according to one or more embodiments of the present disclosure, a computer-readable storage medium is provided, wherein the computer-readable storage medium stores computer executable instructions, and when a processor executes the computer executable instructions, causing a computing device to implement the method of any one of the first aspect.

In accordance with a fifth aspect, according to one or more embodiments of the present disclosure, a computer program is provided, wherein the computer program is configured to implement the method according to any one of the first aspect.

In accordance with a sixth aspect, according to one or more embodiments of the present disclosure, a computer program product is provided, wherein the computer program product comprises a computer program, and the computer program, when executed by a processor, implements the method of any one of the first aspect.

The above description is only a description of the preferred embodiments of the present disclosure and the technical principles applied. Those skilled in the art should understand that the disclosure scope involved in the present disclosure is not limited to technical solutions formed by specific combinations of the above technical features, but should also cover other technical solutions may be formed by any combination of the above technical features or their equivalent features without departing from the above disclosed concept. For example, a technical solution is formed by replacing the above features with (but not limited to) technical features with similar functions disclosed in the present disclosure.

Furthermore, although operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

What is claimed is:

1. An effect processing method, comprising:

obtaining an image, the image specifying a shape of an effect screen, the image comprising target motion attributes of at least two positions, the target motion attribute of each position being used for forming particles into a target shape after motion;

during motion process of at least two particles, adjusting the motion attribute of the particles at the current position according to target motion attributes corresponding to the current position of the particles in the image, the adjustment being used for reducing a difference between the motion attribute and the target motion attribute; and displaying the particles according to the adjusted motion attribute to obtain the effect screen, the particles being geometric display objects, wherein adjusting the motion attribute of the particles at the current position according to target motion attributes corresponding to the current position of the particles in the image comprises:

converting the current position of the particles in a world coordinate system to a second position of the particles in a geometry, wherein the target shape is located in the geometry, and a coordinate system of the geometry is different from the world coordinate system;

obtaining a vector difference between the target motion attribute corresponding to the second position of the particles in the image and the motion attribute before adjustment;

obtaining an adjustment amount based on a product of the vector difference and a preset coefficient, wherein the preset coefficient is greater than 0 and less than 1; and adjusting the motion attribute of the particles at the current position based on a sum of the adjustment amount and the motion attribute before adjustment.

2. The method of claim 1, wherein converting the current position of the particles in the world coordinate system to the second position of the particles in the geometry comprises:

converting the current position of the particles in the world coordinate system to the second position of the particles in the geometry according to attributes of the geometry, wherein the attributes of the geometry comprise at least one of the following: a size of the geometry, a center position of the geometry, or an angle of the geometry relative to the world coordinate system.

3. The method of claim 1, wherein each position in the image is a normalized position, and wherein according to the target motion attribute corresponding to the second position of the particles in the image, adjusting the motion attribute of the particles at the current position comprises:

normalizing the second position to obtain a third position, wherein each coordinate of the third position is greater than or equal to 0 and less than or equal to 1; and according to target motion attribute corresponding to the third position of each particle in the image, adjusting the motion attribute of the particles at the current position.

4. The method of claim 1, wherein adjusting the motion attribute of the particles at the current position according to target motion attributes corresponding to the current position of the particles in the image comprises:

performing a weighted summation to the target motion attributes corresponding to the current position of the particles in the image and the motion attributes of the particles at the current position, to obtain adjusted motion attributes, wherein a weighting coefficient of the target motion attributes and a weighting coefficient of the motion attributes are both greater than 0, and a sum of the weighting coefficient of the target motion attributes and the weighting coefficient of the motion attributes is 1.

5. The method of claim 1, wherein after adjusting the motion attribute of the particles at the current position according to target motion attributes corresponding to the current position of the particles in the image, the method further comprises:

updating the current position of the particles according to the adjusted motion attribute, and entering a step of adjusting the motion attribute of the particles at the current position according to the target motion attribute corresponding to the current position of the particles in the image.

6. The method of claim 1, wherein obtaining the image comprises:

obtaining a target model corresponding to the target shape, the target model comprising at least two points; and converting a position of each point in the target model to the target motion attribute of the position in the image.

7. The method of claim 6, wherein the target motion attribute, the position in the image, and the motion attribute of the particles are all three-dimensional vectors, and wherein the target model is a three-dimensional model.

8. The method of claim 6, wherein the target shape is an inscribed shape of the geometry.

9. An electronic device comprising: at least one processor and a memory, wherein the memory stores computer executable instructions, the at least one processor executes the computer executable instructions stored in the memory, causing the electronic device to:

obtain an image, the image specifying a shape of an effect screen, the image comprising target motion attributes of at least two positions, the target motion attribute of each position being used for forming particles into a target shape after motion;

during motion process of at least two particles, adjust the motion attribute of the particles at the current position according to target motion attributes corresponding to the current position of the particles in the image, the adjustment being used for reducing a difference between the motion attribute and the target motion attribute; and display the particles according to the adjusted motion attribute to obtain the effect screen, the particles being geometric display objects, and the electronic device being caused to adjust the motion attribute of the particles at the current position according to target motion attributes corresponding to the current position of the particles in the image includes being caused to:

convert the current position of the particles in a world coordinate system to a second position of the particles in a geometry, wherein the target shape is located in the geometry, and a coordinate system of the geometry is different from the world coordinate system;

obtain a vector difference between the target motion attribute corresponding to the second position of the particles in the image and the motion attribute before adjustment;

obtain an adjustment amount based on a product of the vector difference and a preset coefficient, wherein the preset coefficient is greater than 0 and less than 1; and adjust the motion attribute of the particles at the current position based on a sum of the adjustment amount and the motion attribute before adjustment.

10. The electronic device of claim 9, wherein the electronic device being caused to convert the current position of the particles in the world coordinate system to the second position of the particles in the geometry includes being caused to:

convert the current position of the particles in the world coordinate system to the second position of the particles in the geometry according to attributes of the geometry, wherein the attributes of the geometry comprise at least one of the following: a size of the geometry, a center position of the geometry, or an angle of the geometry relative to the world coordinate system.

11. The electronic device of claim 9, wherein each position in the image is a normalized position, and wherein the electronic device being caused to according to the target motion attribute corresponding to the second position of the particles in the image, adjust the motion attribute of the particles at the current position includes being caused to:

normalize the second position to obtain a third position, wherein each coordinate of the third position is greater than or equal to 0 and less than or equal to 1; and according to target motion attribute corresponding to the third position of each particle in the image, adjust the motion attribute of the particles at the current position.

12. The electronic device of claim 9, wherein the electronic device being caused to adjust the motion attribute of the particles at the current position according to target motion attributes corresponding to the current position of the particles in the image includes being caused to:

perform a weighted summation to the target motion attributes corresponding to the current position of the particles in the image and the motion attributes of the particles at the current position, to obtain adjusted motion attributes, wherein a weighting coefficient of the target motion attributes and a weighting coefficient of the motion attributes are both greater than 0, and a sum of the weighting coefficient of the target motion attributes and the weighting coefficient of the motion attributes is 1.

13. The electronic device of claim 9, wherein after the electronic device being caused to adjust the motion attribute of the particles at the current position according to target motion attributes corresponding to the current position of the particles in the image, the electronic device is further being caused to:

update the current position of the particles according to the adjusted motion attribute, and enter a step of adjusting the motion attribute of the particles at the current position according to the target motion attribute corresponding to the current position of the particles in the image.

14. The electronic device of claim 9, wherein the electronic device being caused to obtain the image includes being caused to:

obtain a target model corresponding to the target shape, the target model comprising at least two points; and convert a position of each point in the target model to the target motion attribute of the position in the image.

15. The electronic device of claim 14, wherein the target motion attribute, the position in the image, and the motion attribute of the particles are all three-dimensional vectors, and wherein the target model is a three-dimensional model.

16. The electronic device of claim 14, wherein the target shape is an inscribed shape of the geometry.

17. A non-transitory computer-readable storage medium, wherein the computer-readable storage medium stores computer executable instructions, and when a processor executes the computer executable instructions, causing a computing device to:

obtain an image, the image specifying a shape of an effect screen, the image comprising target motion attributes of at least two positions, the target motion attribute of each position being used for forming particles into a target shape after motion;

during motion process of at least two particles, adjust the motion attribute of the particles at the current position according to target motion attributes corresponding to the current position of the particles in the image, the adjustment being used for reducing a difference between the motion attribute and the target motion attribute; and display the particles according to the adjusted motion attribute to obtain the effect screen, the particles being geometric display objects, and wherein the computing device being caused to adjust the motion attribute of the particles at the current position according to target motion attributes corresponding to the current position of the particles in the image includes being caused to:

convert the current position of the particles in a world coordinate system to a second position of the particles in a geometry, wherein the target shape is located in the geometry, and a coordinate system of the geometry is different from the world coordinate system;

obtain a vector difference between the target motion attribute corresponding to the second position of the particles in the image and the motion attribute before adjustment;

obtain an adjustment amount based on a product of the vector difference and a preset coefficient, wherein the preset coefficient is greater than 0 and less than 1; and adjust the motion attribute of the particles at the current position based on a sum of the adjustment amount and the motion attribute before adjustment.

* * * * *